Sept. 2, 1947.  C. S. BUSQUE  2,426,816
DISMOUNTABLE ENDLESS TREAD TRACTOR UNIT FOR POWER VEHICLES
Filed Oct. 20, 1945  2 Sheets-Sheet 1
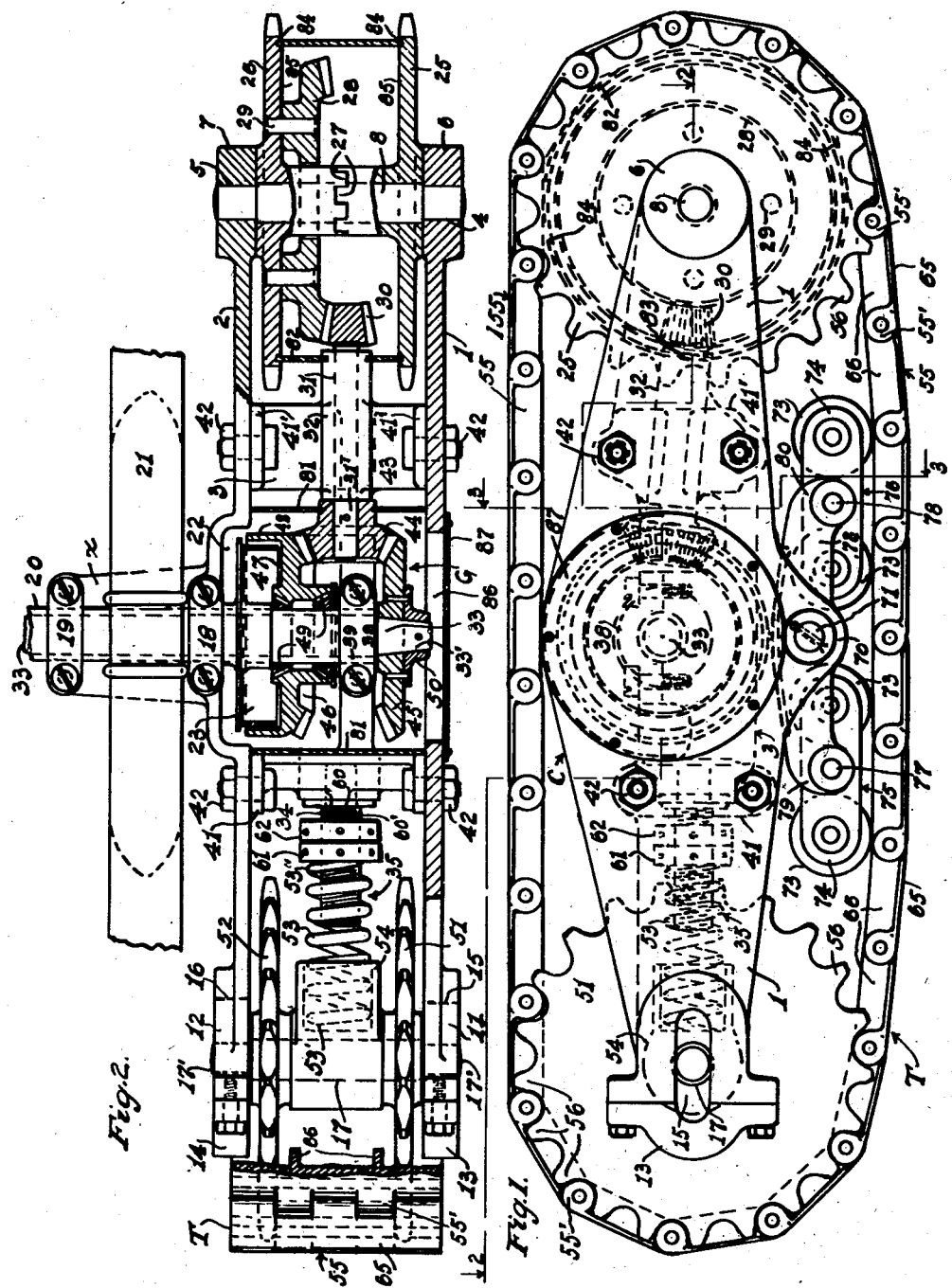
INVENTOR
Charles S. Busque
BY
Harold D. Penney  ATTORNEY

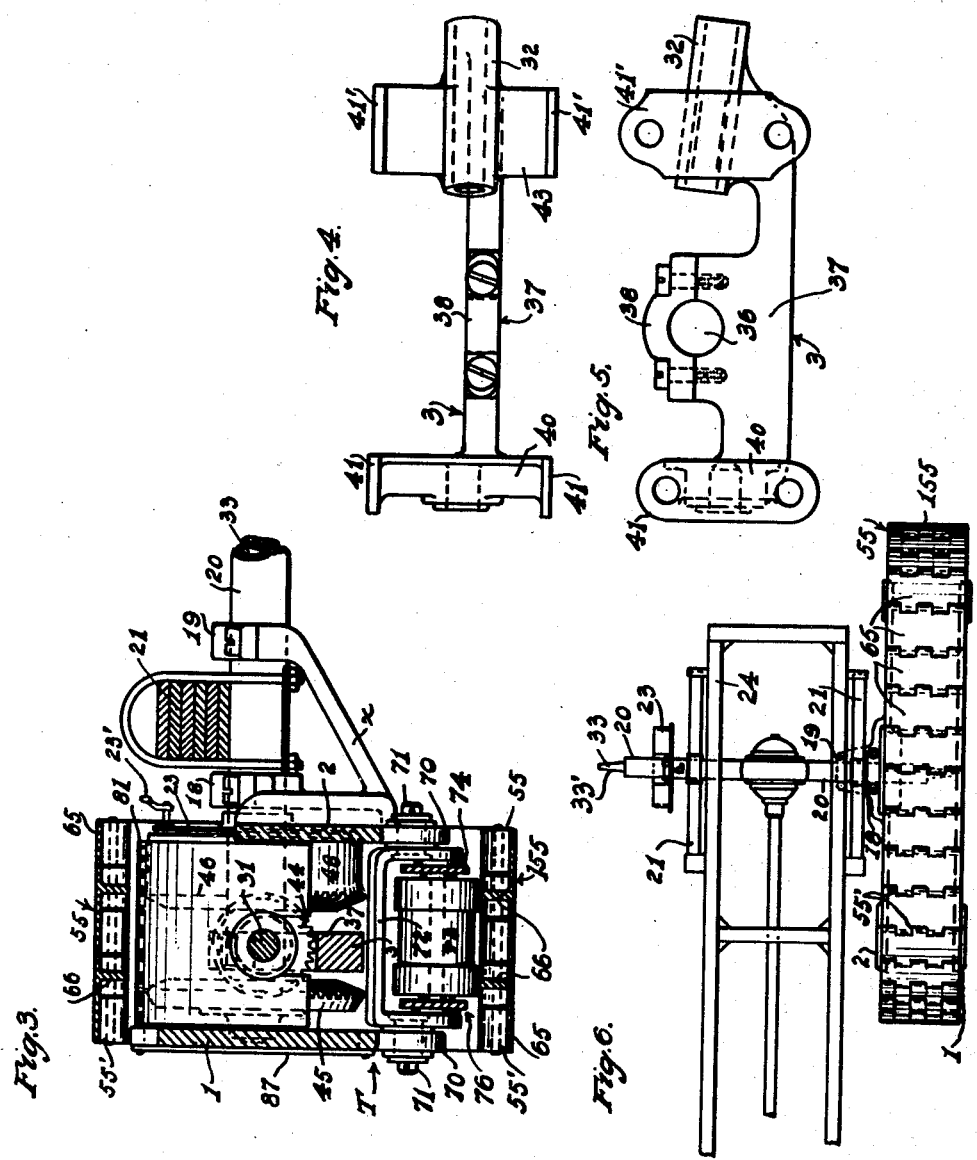

Patented Sept. 2, 1947

2,426,816

UNITED STATES PATENT OFFICE 2,426,816

DISMOUNTABLE ENDLESS TREAD TRACTOR UNIT FOR POWER VEHICLES

Charles Simeon Busque, Saint Gideon de Beauce, Quebec, Canada, assignor to Olvida Busque, New York, N. Y.

Application October 20, 1945, Serial No. 623,508

3 Claims. (Cl. 180—9.1)

1

This invention relates to tractors, and tractors having endless treads and more particularly to tractor units adapted to be substituted for the drive means of trucks or other vehicles.

One object of the invention is to provide an improved tractor unit adapted to be at will interchanged with the drive wheels of motor trucks, automobiles and the like.

Other objects of the invention are to provide an apparatus or device of this kind having an elongated chain tread, and improved means for equalizing the pressure of the tread on uneven ground.

Other objects of the invention are to provide an apparatus or device of this kind having an automatic means for taking up chain slack, and an improved braking mechanism for the unit.

Other objects of the invention are to improve generally the simplicity and efficiency of such apparatus and to provide a tractor adapter unit of this kind which is economical, durable and reliable in operation, and economical to manufacture.

In the accompanying drawing showing, by way of example, one of many possible embodiments of the invention, Fig. 1 is a side elevation of one of the tractor units, showing the chain tread and roller bearing support mechanism.

Fig. 2 is a plan of the tractor unit, taken on the line 2—2, of Fig. 1, the chain being broken away to show the front sprocket and the adjustable spring means for taking up the slack of the chain.

Fig. 3 is a sectional view, taken on the line 3—3 of Fig. 1, showing the chain roller bearing assembly, and the method of attaching the tractor unit to the axle housing of a truck.

Fig. 4 is a plan of the frame spacing and bearing bracket member.

Fig. 5 is a side elevation of the member of Fig. 4.

Fig. 6 is a plan of reduced scale showing a rear axle and part of a frame of a truck, the wheels of the truck having been removed and a tractor mechanism unit attached to one end of the axle housing.

Referring particularly to Figs. 1 and 2, I have shown the mechanism of a complete tractor unit T, having inner and outer plate members or side frames as 1 and 2, securely held in spaced relation to one another at their central portions C (Fig. 1) by a spacing bracket 3. The said side frame members 1 and 2 are provided with bores 4 and 5 at their rear ends 6 and 7 respectively which are

2 adapted to receive a shouldered sprocket shaft 8. The forward ends of the said frames 1 and 2 are fork shaped as 11 and 12 and provided with bolted caps 13—14, to form elongated openings 15, 16 adapted to receive a shouldered adjustable sprocket shaft 17. The inner side frame 2 is provided at its mid portion C, with an exterior lateral extension X, provided with capped bearings 18 and 19, as shown in Figs. 2 and 3, adapted to receive the axle sleeve 20 on each side of the truck spring 21, thereby holding the tractor unit to the truck 24.

The inner side frame 2 is also provided at its central portion C, with a recessed portion 22, which forms a clearance for the brake drum mechanism 23 of the said truck 24.

The rear shouldered shaft 8, is provided with a pair of large diameter sprockets 25 and 26, which are loosely mounted upon the said shaft 8, and the said sprockets are provided with inter-engaging toothed bosses 27, which constrain the sprockets to rotate together.

The inner rear sprocket 26 is provided with a bevel driven gear 28 of large diameter which is securely attached thereto by rivets 29 and adapted to mesh with a small bevel pinion 30 formed integral with a longitudinal shaft 31 rotatably supported in an elongated bearing 32, formed on the spacing bracket member 3.

As will be explained, said bracket 3 serves as a support for the outer end 39 of the sleeve 20 of the truck axle 33, and as an anchorage for a spring adjusting screw 34 (Fig. 2) of the chain tightening mechanism 35.

Reference is made to Figs. 4 and 5 wherein the said spacing bracket 3 is shown with a capped, bored hole 36 at its narrow mid portion 37. The said hole 36, and bolted cap 38, serve to support and lock the outer end 39 of the axle sleeve 20, to the tractor unit.

The forward end as 40 of the said bracket 3 is provided with ears 41 which are adapted to be riveted or bolted as by bolts 42 to the said side frames 1 and 2. The rear end 43 of the said bracket 3 is provided with ears similar to 41' and 41' bolted by bolts 42 to the side frames, thereby joining the two side frames 1 and 2 between the said spacing member 3 in proper alignment for the gear drive 9 and the chain sprockets 25 and 26, 51 and 52.

Another bevel pinion 44 (Fig. 2) attached to the inner end 31' of the said shaft 31, meshes with a drive gear 45 located on the tapered end 33' of the truck axle 33, and attached to a flange 50 which is secured to the tapered end 33' of the truck axle 33.

The pinion 44 also meshes with an idler or drum gear 46, which is rotatably supported by roller bearings 49 attached to the axle sleeve 20, and forms, at its inner side 47, a drum 48 which houses the brake mechanism 23 of the truck.

The truck axle sleeve 20 carries integrally formed thereon the usual brake mechanism 23 and operating mechanism 23' (Fig. 6); and when the wheels of the truck are removed, the axle-housing 20 and brake mechanism 23 are ready to receive the tractor mechanism.

The tractor drive mechanism is indicated at G (Fig. 2). Rotation of the axle 33 drives the attached gear 45 which drives the pinion gear 44 causing the small pinion 30 to drive the bevel gear 28 and consequently the pair of interconnected sprockets 25 and 26 at the proper rate of speed, as determined by the gear ratios.

A pair of forward idler sprockets 51 and 52 (Figs. 2 and 3) are rotatably mounted upon the fixed shaft 17 and held in a forward position by an adjustable tensioned spring 53, pressing forwardly on a spring block 54 having a transverse bore received on the shaft 17 between the sprockets as will be explained, the reduced ends 17 of said shaft reposing in slotted openings 15 and 16 in the forward ends 13 and 14, of the side frames 1 and 2. The caps 13 and 14 facilitate the assembly of the idler sprockets 51 and 52 and spring mechanism 35.

A suitable link chain tread 55 disposed on the sprockets comprises a series of hinged links 55 connected by hinge portions 55, and adapted to engage the sprocket teeth 56 of the sprockets, said chain hinge portions 55' engaging between the teeth 56, the chain tread 155 extending longitudinally around the entire mechanism.

The adjustable tension spring mechanism 35 (Fig. 2) serves to take up the slack of the chain tread and comprises a heavy spring 53, one end 53' of which is suitably held in place by a bore in the block 54, the other end 53'' of the spring being disposed upon a threaded post 60 having threads 60' and secured in the bracket 37. The spring is held in a tensioned position by a nut 61 and lock nut 62, to keep the shaft 17 and sprockets 51 and 52 in a forward position and tends to keep the chain taut upon the drive sprockets.

The brake mechanism structure 23, when assembled in with the drum 48 is similar to the usual type and may be operated in the usual manner from the operator's seat, and may be of the hydraulic or mechanical type, and when expanded will cause the necessary friction on the inner surface of the drum 48 to bring the tractor to rest.

The chain 155 as shown in Fig. 3 extends the full width of the unit across both sprockets and are hinged together, by the hinge portion 55' serving as rollers to be engaged by the sprocket teeth 56 of the sprockets. The chain links 55 as shown in Fig. 3 are also provided with a tread portion 65 and inner longitudinal ribs 66, adapted to be engaged by weight equalizing rollers as 73 for a purpose which will now be explained.

It is very important in the operation of tractors to keep a sufficient length chain tread surface on the ground which at times is very uneven, and also to distribute the weight of the truck evenly along a length of chain, therefor I have provided a chain track and roller bearing construction to attain this result and which also tends to keep the truck axle free from the shocks of bumpy ground surfaces.

In order to support these rollers, the inner and outer side plates 1 and 2 of the tractor T are provided with downwardly extending ears 70, Figs. 1 and 3, which are bored to receive pivots 71 and these pivots rockably carry a U-shaped rocker member 72, which serves to support pivoted equalizing plates 74 (Fig. 3) between which the rollers are journalled and are adapted to ride upon the longitudinal track ribs 66 of the chain 155. As shown in Fig. 1 there are two rollers to each pair of side plates comprising units as 75 and 76 and each unit is pivotally held, as 77 and 78, to pivot ends 79 and 80 of the U-shaped rocker member 72.

The outer side frame 1, of the tractor mechanism is provided with an opening 86 through which the large bevel gear 45 may be removed. A cover 87 which is bolted to the said side frame 1, is provided to close the opening.

Dust covers 81 and 82 are provided to keep dust and dirt from the gear G and the chain drive mechanism. One of these covers 81 enshrouds the upper part of the brake and drive gear mechanism G, and is substantially supported, between the side frames 1 and 2 of the tractor. The other cover 82 is formed as a split band with a split as at 83 (Fig. 1) to allow for assembling, and is held loosely in grooves 84 (Fig. 2) formed in the inner sides 85 of each rear drive sprocket 25 and 26.

When the tractor units are used, the truck or automobile is controlled in the usual way, the gears 28, 30, 44, 45 forming reducing gears so that the axle 33 may be driven at the usual speeds without the chain tread being driven at too high a speed. This transmits power from the axle 33, through the shaft 31 to the rear sprockets, and thence to the chain tread.

When the tractor unit is to be removed for the substitution of wheels, the parts 18, 19 and 87 (Fig. 2), and the pin in flange 50 are removed, and the cap 38 is loosened, whereupon the unit including the brake-drum 48 may be removed, the braking mechanism remaining in place for cooperation with the usual brake drum on the wheel. Thus the invention is such that the automobile may be easily converted from a tractor to an automobile and vice versa.

I claim as my invention:

1. A tractor unit for a motor vehicle having a sleeve and a drive axle therein, said tractor unit comprising inner and outer spaced side members and a bracket connecting said members and received on said sleeve; an adjustable sprocket shaft and a drive sprocket shaft on the respective ends of the members; idler sprockets and interconnected drive sprockets on said shafts respectively; a chain tread on the sprockets; yieldable spring means compressed between said bracket and adjustable shaft; transmission means connecting the drive sprockets and axle and comprising gears on said axle and one of the drive sprockets and a shaft on said bracket carrying pinions engaging said gears; and pressure equalizing means on said unit engaging the inner face of the lower part of the tread.

2. A tractor unit for combination with a motor vehicle having a sleeve and a drive axle therein, said tractor unit comprising inner and outer side plates and a bracket connecting said plates and received on said sleeve; idler sprockets and interconnected drive sprockets on the respective ends of the plates; a chain tread on the sprockets; and transmission means connecting the drive sprockets and axle and comprising gears on said axle and one of the drive sprockets and a shaft on said bracket carrying pinions engaging said gears.

3. A tractor unit for a motor vehicle having a sleeve and a drive axle therein, said tractor unit comprising inner and outer side plates and a bracket connecting said plates and received on said sleeve; idler sprockets and interconnected drive sprockets on the respective ends of the plates; a chain tread on the sprockets; transmission means connecting the drive sprockets and axle and comprising gears on said axle and one of the drive sprockets and a shaft on said bracket carrying pinions engaging said gears; the outer plate being provided with a large opening adjacent to said axle and adjacent gears; a cover plate for said opening; and a dust cover between said plates and surrounding said adjacent gears.

CHARLES SIMEON BUSQUE.

REFERENCES CITED

The following references are of record in the file of this patent:

UNITED STATES PATENTS

| Number | Name | Date |
|---|---|---|
| 1,288,203 | Rodin | Dec. 17, 1918 |
| 1,353,945 | Blewett | Sept. 28, 1920 |
| 1,388,750 | Palmer | Aug. 23, 1921 |
| 2,034,125 | Wickersham | Mar. 17, 1936 |
| 1,975,794 | Knox et al. | Oct. 9, 1934 |
| 1,514,158 | Holt | Nov. 4, 1924 |
| 2,116,835 | Kegresse | May 10, 1938 |